United States Patent Office 3,719,634
Patented Mar. 6, 1973

3,719,634
ROOM TEMPERATURE VULCANIZABLE SILICONE ELASTOMERS CONTAINING METAL HYDROCARBONOXIDES
William H. Clark, Mount Pleasant, Thomas W. Greenlee, Midland, and Louis H. Toporcer, Ingersol Township, Midland County, Mich., assignors to Dow Corning Corporation, Midland, Mich.
No Drawing. Filed June 18, 1971, Ser. No. 154,647
Int. Cl. C08f 11/04
U.S. Cl. 260—46.5 G    10 Claims

ABSTRACT OF THE DISCLOSURE

Room temperature vulcanizable silicone elastomer compositions prepared by mixing a hydroxyl endblocked polydiorganosiloxane, an alkoxy silicon compound, a metal salt of a carboxylic acid and a metal hydrocarbonoxide, such as $Fe(OR)_3$, $V(OR')_3$, $Co(OR')_2$, $MoO_2(OR')_2$, $Zn(OR')_2$, $Ce(OR')_3$ and $Al(OCH_2CH_3)_3$ where R is ethyl, propyl, butyl or phenyl and R' is ethyl, propyl or butyl has improved adhesion to metal surfaces.

This invention relates to room temperature vulcanizable silicone elastomers which have improved adhesion to metal surfaces.

A variety of techniques have been used to adhere silicone rubber to substrates such as metals, which include using primers, adhesive compositions and additives to the room temperature vulcanizable silicone elastomer composition. Of the three techniques recited above, the use of additives in the room temperature vulcanizable silicone elastomer composition is the most desirable, since the user is required to handle only one composition.

It is therefore an object of this invention to provide a room temperature vulcanizable silicone elastomer composition which contains an additive which increases the adhesion to substrates such as metal surfaces without the use of primers or adhesive compositions.

This invention relates to a room temperature vulcanizable silicone elastomer composition consisting essentially of a composition prepared by mixing (A) 100 parts by weight of a hydroxyl endblocked polydiorganosiloxane having a viscosity of from 1000 to 100,000 cs. at 25° C. and having organic radicals selected from the group consisting of methyl, ethyl, phenyl and 3,3,3-trifluoropropyl wherein at least 50 percent of the organic radicals are methyl radicals, (B) from 1 to 15 parts by weight of an alkoxy silicon compound selected from the group consisting of tetraalkoxysilane, polyalkylsilicate, monoorganotrialkoxysilane and partial hydrolyzates of the monoorganotrialkoxysilane and mixtures thereof wherein the organic group is selected from the group consisting of alkyl radicals having from 1 to 6 carbon atoms inclusive, vinyl radicals, phenyl radicals and 3,3,3-trifluoropropyl radicals and the alkoxy radicals and the alkyl radicals having from 1 to 6 carbon atoms inclusive, (C) from 0.1 to 10 parts by weight of a metal salt of a carboxylic acid catalyst, and (D) from 0.01 to 2 parts by weight inclusive metal in the form of a metal hydrocarbonoxide selected from the group consisting of $Fe(OR)_3$, $V(OR')_3$, $Co(OR')_2$, $MoO_2(OR')_2$, $Zn(OR')_2$, $Ce(OR')_3$ and $Al(OCH_2CH_3)_3$ wherein R is selected from the group consisting of ethyl, normal propyl, normal butyl and phenyl and R' is selected from the group consisting of ethyl, normal propyl and normal butyl.

The room temperature vulcanizable silicone elastomer compositions of the present invention are known as two package or two component compositions. Two or more packages are needed because the composition begins curing when the hydroxyl endblocked polydiorganosiloxane, the alkoxy silicon compound and the catalyst, the metal salt of a carboxylic acid, are mixed. For this reason, the ingredients are separated into separate packages until the user wishes curing to begin. Usually, the hydroxyl endblocked polydiorganosiloxane and the filler, when present, are stored in one package and the alkoxy silicon compound and catalyst are stored in another package. In the present composition, the metal hydrocarbonoxide would preferably be stored with the alkoxy silicon compound.

The room temperature vulcanizable silicone elastomer compositions of the present invention are well known in the art if the presence of the metal hydrocarbonoxide is excluded and are available commercially.

The hydroxyl endblocked polydiorganosiloxane can have a viscosity of from 1000 to 100,000 cs. at 25° C., preferably from 1000 to 50,000 cs. at 25° C. The organic radicals of the polydiorganosiloxane can be methyl, ethyl, phenyl and 3,3,3-trifluoropropyl where at least 50 percent of the organic radicals are methyl. The hydroxyl endblocked polydiorganosiloxanes can be illustrated by polydimethylsiloxane, polymethyl - 3,3,3-trifluoropropylsiloxane, polyethylmethylsiloxane, polydiethylsiloxane and polydiorganosiloxanes which are copolymers of two or more units of dimethylsiloxane units, diphenylsiloxane units, methylphenylsiloxane units, diethylsiloxane units and 3,3,3-trifluoropropylmethylsiloxane units. Mixtures and blends of polydiorganosiloxanes can also be used.

The crosslinking agent can be an alkoxy silicon compound which can be illustrated by orthosilicates such as ethylorthosilicate, n-propylorthosilicate, amylorthosilicate, pentenylorthosilicate, diethyldipropylorthosilicate and hexylorthosilicate, alkylpolysilicates such as methylpolysilicate, ethylpolysilicate, isopropylpolysilicate, n-propylpolysilicate, secondary amylpolysilicate and n-butylpolysilicate; monoorganotrialkoxysilanes such as methyltrimethoxysilane, ethyltriethoxysilane, propyltrimethoxysilane, methyltriisopropoxysilane, phenyltrimethoxysilane, vinyltrimethoxysilane; and other alkoxy silicon compounds such as $Si(OCH_2CH_2OCH_3)_4$, $Si(OCH_2CH_2OCH_2CH_3)_4$, $C_6H_5Si(OCH_2CH_2OCH_3)_3$, $$CF_3CH_2CH_2Si(OCH_2CH_2OCH_3)_3$$

and the like. The alkoxy silicon compound is present in an amount of from 1 to 15 parts by weight per 100 parts by weight of the hydroxyl endblocked polydiorganosiloxane, preferably from 2 to 10 parts by weight.

The curing catalyst can be illustrated by metal salts of carboxylic acids such as lead naphthenate, cobalt naphthenate, zinc naphthenate, sodium naphthenate, iron 2-ethylhexoate, lead 2-ethylhexoate, chromium octoate, dibutyltin dibenzoate, dibutyltin adipate, lead sebacate, dibutyltin dilactate, dibutyltin diacetate, dibutyltin dilaurate, lead octoate, tin ricinoleate, cobalt hexoate, aluminum acetylacetonate, zirconium acetoacetate, dioctyltindimaleinate, stannous octoate and the like. The metal salt of carboxylic acid is present in an amount of from 0.1 to 10 parts by weight per 100 parts by weight of the hydroxyl endblocked polydiorganosiloxane, preferably from 0.5 to 5 parts by weight.

The hydroxyl endblocked polydiorganosiloxanes, the alkoxy silicon compound and the metal salt of a carboxylic acid are further defined in the following patents with respect to ingredients and methods of combining the ingredients. The following patents are hereby incorporated by reference and include U.S. Pat. No. 2,843,555 by Berridge, U.S. Pat. No. 2,902,467 by Chipman, U.S. Pat. No. 2,927,907 by Polmanteer, U.S. Pat. No. 3,065,194 by Nitzsche et al., U.S. Pat. No. 3,070,559 by Nitzsche et al., U.S. Pat. No. 3,070,566 by Nitzsche et al., U.S. Pat. No. 3,127,363 by Nitzsche et al. and U.S. Pat. No. 3,305,502 by Lampe.

The ingredient which enhances the adhesion of the room temperature vulcanizable silicone elastomer to metal is a metal hydrocarbonoxide. The metal hydrocarbonoxide is added to the composition in amounts sufficient to provide from 0.01 to 2 parts by weight of metal per 100 parts by weight of hydroxyl endblocked polydiorganosiloxane, preferably from 0.02 to 1 part by weight metal is present. The metal hydrocarbonoxides which are operative in the present invention are $Fe(OR)_3$, $V(OR')_3$,

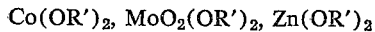

$Ce(OR')_3$ and $Al(OCH_2CH_3)_3$ where R is ethyl, normal propyl, normal butyl or phenyl and R' is ethyl, normal propyl or normal butyl. Examples of the metal hydrocarbonoxides include, $Fe(OCH_2CH_3)_3$,

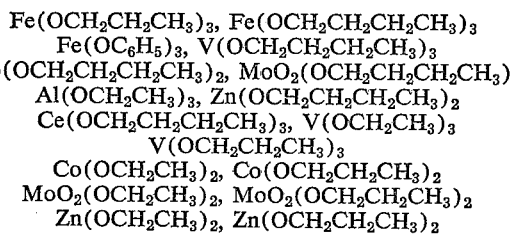

$Ce(OCH_2CH_3)_3$ and $Ce(OCH_2CH_2CH_3)_3$.

These metal hydrocarbonoxides are known in the art, are available commercially or can be prepared by known methods. The best method for preparing the metal hydrocarbonoxides was to mix the alcohol of the desired hydrocarbonoxide with sodium to form the sodium hydrocarbonoxide and then add the corresponding metal chloride to the sodium hydrocarbonoxide in a solvent, preferably the alcohol corresponding to the hydrocarbonoxide.

The room temperature vulcanizable silicone elastomers of this invention can also contain fillers and additives which are well known in the art as described in the patents incorporated herein by reference.

The room temperature vulcanizable silicone elastomer is prepared by mixing all the ingredients. The method of mixing can be any of those known in the art. Since the metal hydrocarbonoxide is already in an alcohol solution after preparation, the metal hydrocarbonoxide can be added to the room temperature vulcanizable silicone elastomer in this form. The room temperature vulcanizable silicone elastomer can be packaged, and stored as described above and mixed when cure is desired. The metal hydrocarbonoxides in the room temperature vulcanizable silicone elastomer have shelf lives of a year or more and the properties of the cured elastomer are not affected by the metal hydrocarbonoxides.

The room temperature vulcanizable silicone elastomers when applied to metal surfaces exhibit increased adhesion of the cured silicone elastomer to the metal surface compared to the same composition without the metal hydrocarbonoxide. The metal surfaces can be metals such as iron, steel, stainless steel, aluminum, titanium, copper, tin and alloys thereof.

The following examples are illustrative only and should not be construed as limiting the present invention which is properly delineated in the claims.

EXAMPLE 1

Ferric n-butoxide

In a one liter round bottom flask equipped with a stirrer and reflux condenser were placed 405 g. of n-butanol and 27.6 g. of sodium. The reaction mixture was heated until all the sodium had reacted and the resulting sodium n-butoxide solution was cooled to about 5° C. with an ice bath. To this solution 65.0 g. of anhydrous ferric chloride was added in proportions with stirring. After all the ferric chloride had been added, the ice bath was removed and the stirring was continued for ten minutes. The by-produced sodium chloride was separated from the product, ferric n-butoxide by centrifugation, the centrifugate being the product. No chloride ion was found by analysis and three drops of the product in 10 cc. of deionized water showed a pH of 5 to 6 using pH paper. The solution had an iron content of 4.08 percent.

Ferric ethoxide

Ferric ethoxide solution was prepared as described above for ferric n-butoxide using 237 g. of absolute ethanol, 13.8 g. of sodium and 32.5 g. of anhydrous ferric chloride. The centrifuged solution slowly deposited crystals on standing in accordance with description given by P. A. Thiessen and O. Koerner, in Zeit. Anorg. Chem., vol. 180, p. 65 (1929) where the solubility of ferric ethoxide at room temperature in ethanol is reported to be 3.2 to 3.8%. The solution before crystallization had an iron content of 2.4%. No chlorine ion was detected by analysis and three drops of the solution in 10 cc. of water showed a pH of 6 to 7 with pH paper.

Ferric n-propoxide

Ferric n-propoxide solution was prepared as described above for ferric n-butoxide using 201 g. of n-propanol, 13.8 g. of sodium and 32.5 g. of anhydrous ferric chloride. After the removal of the sodium chloride by centrifugation, the resulting solution contained 3.76% iron and no detectable chlorine ion. The pH was the same as for ferric n-butoxide.

Ferric phenoxide

Ferric phenoxide was prepared similarly to the ferric n-butoxide described above. In this case, 29.4 g. of phenol were dissolved in 200 ml. of dry 1,2-dimethoxyethane and then 7.20 g. of sodium was added. This mixture was heated until the sodium had reacted and then was cooled with an ice bath before adding 17.0 g. of anhydrous ferric chloride all at once. After stirring the mixture for ten minutes while being cooled with ice bath, the mixture was allowed to warm to room temperature and stand overnight. The mixture was centrifuged and the supernatant liquid was the ferric phenoxide solution.

Zinc n-butoxide

Zinc n-butoxide solution was prepared as described above using 243 g. of dry n-butanol, 13.8 g. of sodium and 40.9 g. of anhydrous zinc chloride. The resulting product was a very pale tan solution of zinc n-butoxide which showed a pH of 7 to 8 with pH paper when tested as described above and no chlorine ion was detected.

Cobalt n-butoxide

Cobalt n-butoxide solution was prepared as described above using 162 g. of n-butanol, 10.5 g. of sodium and 29.7 g. of anhydrous $CoCl_2$ prepared by heating $$CoCl_2 \cdot 6H_2O$$

overnight at 150° C. The resulting cobalt n-butoxide showed a pH of 10 when tested as described above. The cobalt n-butoxide produced a grayish suspension when added to the water.

Cerium n-butoxide

Anhydrous $CeCl_3$ was prepared by mixing $$CeCl_3 \cdot 7H_2O$$

with one tenth its weight of ammonium chloride and heating the mixture at 350° C. for five hours. 28.1 g. of the resulting anhydrous $CeCl_3$ was added to the reaction product of 7.88 g. of sodium and 162 g. of n-butanol. The reaction mixture was heated at 55° to 60° C. for several hours to complete the formation of $$Ce(OCH_2CH_2CH_2CH_3)_3$$

The by-produced sodium chloride was removed by centrifugation.

Vanadium n-butoxide

Vanadium n-butoxide solution was prepared by reacting 10.0 g. of anhydrous $VCl_3$ with the reaction product of 4.38 g. of sodium and 81 g. of n-butanol at room temperature. The by-produced sodium chloride was removed by centrifugation. The resulting brown solution of $V(OCH_2CH_2CH_2CH_3)_3$ contained 2.37% vanadium and 53 p.p.m. chlorine ion was detected.

Molybdyl n-butoxide

Molybdyl n-butoxide, $MoO_2(OCH_2CH_2CH_2CH_3)_2$ solution was prepared by adding 10.9 g. of $MoO_2Cl_2$ obtained commercially to the reaction product of 2.50 g. of sodium and 69 g. of n-butanol. The reaction mixture was maintained at room temperature over a two day period providing a yellow solution of $$MoO_2(OCH_2CH_2CH_2CH_3)_2$$

after the sodium chloride was removed by centrifugation. This solution of $MoO_2(OCH_2CH_2CH_2CH_3)_2$ rapidly turns dark blue on exposure to atmospheric moisture. Even when stored over Drierite the solution slowly undergoes this process.

Aluminum ethoxide

The aluminum ethoxide was used as purchased from a commercial source. Other materials used for comparative purposes were either prepared by the procedure described above or were purchased from commercial sources.

Room temperature vulcanizable silicone elastomer compositions were prepared by milling on a three roll rubber mill, 100 parts by weight of a hydroxyl end-blocked polydimethylsiloxane having a viscosity of 12,500 cs. at 25° C. and 30 parts by weight of a fume silica filler having the surface treated with trimethylsiloxy groups, where ferric ethoxide was added as a solid it was milled with the polydimethylsiloxane and filler. The other ingredients were mixed with 4 parts by weight of tetraisopropoxysilane, 0.3 part by weight of dibutyltindiacetate and the amount of metal hydrocarbonoxide to provide the amount of metal as designated in Table I. The two mixtures were mixed and de-aired at reduced pressure to provide the room temperature vulcanizable silicone elastomer.

The mechanical properties were measured at ambient laboratory conditions on samples pressed from 1/16 inch thick sheets of the cured room temperature vulcanizable silicone elastomer. The adhesion test specimens were prepared by applying beads of the room temperature vulcanizable silicone elastomer to aluminum panels previously cleaned by rubbing with paper wipes under trichloroethylene and then under methyl isobutyl ketone. Aluminum and steel foil strips (0.25 inch width by 0.004 inch thickness) similarly cleaned were pressed into the room temperature vulcanizable silicone elastomer beads and cured in chases maintaining the elastomer thickness at 1/8 inch. After the elastomer cured, the elastomer was cut to the panel on each side of the foil strip to obtain standard widths. The force required to peel the strips from the panel at 180° were measured. The tests were at ambient conditions with a jaw separation of two inches per minute.

The amount of cohesive failure was also observed. The results observed were as shown in Table I. The adhesion peel strengths were measured after one week's cure and were reported in pounds per linear inch, p.l.i.

TABLE I

| Specimen number | Metal hydrocarbon oxide | Parts by weight metal added | Durometer | Tensile strength at break, P.s.i. | Elongation at break, percent | Tear strength, p.p.i. | Peal strength Aluminum P.l.i. | Percent cohesive failure | Steel p.l.i. | Percent cohesive failure |
|---|---|---|---|---|---|---|---|---|---|---|
| 1 | None [1] | | | 946 | 715 | | 3 | 0 | 3 | 0 |
| 2 | $Fe(OCH_2CH_3)_3$ in ethanol | 0.024 | 32 | 985 | 760 | 184 | 65 | 0–30 | 30 | 0 |
| 3 | do | 0.072 | 28 | 980 | 770 | 150 | 130 | 50–100 | 100 | 10–100 |
| 4 | $Fe(OCH_2CH_3)_3$, solid crystals | 0.29 | | 880 | 790 | | 60 | 10 | 30 | 0 |
| 5 | $Fe(OCH_2CH_2CH_3)_3$, in n-propanol | 0.038 | 28 | 1,070 | 820 | 171 | 30 | 0 | 30 | 0 |
| 6 | do | 0.084 | 30 | 990 | 790 | 106 | 105 | 10 | 105 | 10 |
| 7 | $Fe(OCH_2CH_2CH_2CH_3)_3$, in n-butanol | 0.040 | 30 | 975 | 765 | 176 | 40 | 0 | 40 | 0 |
| 8 | do | 0.12 | 30 | 965 | 780 | 151 | 80 | 10 | 80 | 10 |
| 9 | do | 0.15 | 28 | 980 | 820 | 76 | 120 | 60–100 | 150 | 100 |
| 10 | do | 0.25 | 27 | 870 | 780 | 140 | 110 | 80 | 130 | 100 |
| 11 | $Fe(OC_6H_5)_3$ in $(CH_3OCH_2)_2$ | 0.028 | 27 | 1,060 | 760 | 120 | 110 | 20 | 38 | 0 |
| 12 | $Fe(OC_6H_5)_3$ in $(CH_3OCH_2)_2$ | 0.084 | 28 | 965 | 710 | 113 | 90 | 10 | 40 | 10 |
| 13 | $Zn(OCH_2CH_2CH_3)_2$ in n-butanol | 0.023 | 28 | 810 | 720 | 159 | 35 | 0 | 35 | 0 |
| 14 | do | 0.069 | 30 | 960 | 780 | 156 | 40 | 0 | 80 | 0 |
| 15 | $V(OCH_2CH_2CH_2CH_3)_3$ in n-butanol | 0.024 | 31 | 935 | 670 | 173 | 140 | 30 | 110 | 10 |
| 16 | do | 0.072 | 29 | 890 | 765 | 196 | 90 | 20 | 120 | 50 |
| 17 | $Co(OCH_2CH_2CH_2CH_3)_2$ in n-butanol | [2] 1.0 | 30 | 950 | 780 | 169 | 80 | 50 | 20 | 0 |
| 18 | do | [2] 3.0 | 32 | 740 | 550 | 94 | 60 | 50 | 30 | 0 |
| 19 | $Ce(OCH_2CH_2CH_2CH_3)_3$ in n-butanol | 0.090 | 28 | 950 | 800 | 179 | 80 | 50 | 40 | 10 |
| 20 | do | 0.27 | 28 | 860 | 750 | 148 | 80 | 50 | 35 | 0 |
| 21 | $MoO_2(OCH_2CH_2CH_2CH_3)_2$ (yellow) in n-butanol | 0.054 | | 863 | 673 | | 80 | 50 | 18 | 0 |
| 22 | do | 0.16 | | 760 | 640 | | 125 | 100 | 125 | 100 |
| 23 | Solution of 21 after turning blue [1] | 0.954 | | 970 | 430 | | 1 | 0 | 1 | 0 |
| 24 | do | 0.16 | | 935 | 420 | | 1 | 0 | 1 | 0 |

[1] For comparative purposes.
[2] Parts by weight of solution added.

EXAMPLE 2

A room temperature vulcanizable silicone elastomer was prepared as described in Example 1 except 2.0 parts by weight of tetraisopropoxysilane was used instead of 4 parts by weight. The metal hydrocarbonoxide was aluminum ethoxide which was added as the compound and was milled with the hydroxyl endblocked polydimethylsiloxane and filler. The results were determined as described in Example 1 and were as shown in Table II.

TABLE II

| Specimen number | Parts by weight Al(OCH₂CH₃)₃ | Durometer | Tensile strength at break, p.s.i. | Elongation at break, percent | Tear strength, p.p.i. | Peel strength Aluminum P.l.i. | Percent cohesive failure | Steel P.l.i. | Percent cohesive failure |
|---|---|---|---|---|---|---|---|---|---|
| 1 | None | | | | | 7 | 0 | 10 | 0 |
| 2 | 0.5 | 27 | 1,000 | 740 | 146 | 100 | 30 | 30 | 0 |
| 3 | 1.0 | 26 | 820 | 780 | 88 | 98 | 50 | 50 | 10 |
| 4 | 1.5 | 27 | 720 | 720 | 100 | 120 | 60 | 120 | 60 |
| 5 | 2.0 | 27 | 840 | 720 | 182 | 80 | 15 | 80 | 15 |

That which is claimed is:

1. A room temperature vulcanizable silicone elastomer composition consisting essentially of a composition prepared by mixing:
   (A) 100 parts by weight of a hydroxyl endblocked polydiorganosiloxane having a viscosity of from 1000 to 100,000 cs. at 25° C. and having organic radicals selected from the group consisting of methyl, ethyl, phenyl and 3,3,3-trifluoropropyl wherein at least 50 percent of the organic radicals are methyl radicals,
   (B) from 1 to 15 parts by weight of an alkoxy silicon compound selected from the group consisting of tetraalkoxysilane, polyalkylsilicate, monoorganotrialkoxysilane and partial hydrolyzates of the monoorganotrialkoxysilane and mixtures thereof wherein the organic group is selected from the group consisting of alkyl radicals having from 1 to 6 carbon atoms inclusive, vinyl radicals, phenyl radicals and 3,3,3-trifluoropropyl radicals and the alkoxy radicals and the alkyl radicals have from 1 to 6 carbon atoms inclusive,
   (C) from 0.1 to 10 parts by weight of a metal salt of a carboxylic acid catalyst, and
   (D) from 0.01 to 2 parts by weight inclusive metal in the form of a metal hydrocarbonoxide selected from the group consisting of Fe(OR)₃, V(OR')₃, Co(OR')₂, MoO₂(OR')₂, Zn(OR')₂, Ce(OR')₃ and Al(OCH₂CH₃)₃, wherein R is selected from the group consisting of ethyl, normal propyl and normal butyl and phenyl and R' is selected from the group consisting of ethyl, normal propyl and normal butyl.

2. The room temperature vulcanizable silicone elastomer composition according to claim 1 wherein a filler is also present.

3. The room temperature vulcanizable silicone elastomer composition according to claim 1 wherein the metal is present in an amount of from 0.02 to 1 part by weight inclusive.

4. The room temperature vulcanizable silicone elastomer composition according to claim 1 wherein the alkoxy silicon compound is a tetraalkoxysilane.

5. The room temperature vulcanizable silicone elastomer composition according to claim 2 wherein the metal hydrocarbonoxide is Fe(OR)₃.

6. The room temperature vulcanizable silicone elastomer composition according to claim 5 wherein R is normal butyl.

7. The room temperature vulcanizable silicone elastomer composition according to claim 2 wherein the metal hydrocarbonoxide is MoO₂(OR')₂.

8. The room temperature vulcanizable silicone elastomer composition according to claim 7 wherein R' is normal butyl.

9. The room temperature vulcanizable silicone elastomer composition according to claim 2 wherein the metal hydrocarbonoxide is Al(OCH₂CH₃)₃.

10. The room temperature vulcanizable silicone elastomer composition according to claim 1 wherein the metal hydrocarbonoxide is added in an alcohol solution where the alcohol has from 2 to 4 inclusive carbon atoms.

References Cited

UNITED STATES PATENTS 3,481,899   12/1969   Marwitz et al. _____ 260—17.4

FOREIGN PATENTS 128,461   1960   U.S.S.R. _____ 260—46.5 G

DONALD E. CZAJA, Primary Examiner

M. I. MARQUIS, Assistant Examiner

U.S. Cl. X.R.

117—135.1; 260—18 S, 37 SB